United States Patent
Seaman et al.

(10) Patent No.: US 10,559,139 B2
(45) Date of Patent: Feb. 11, 2020

(54) ACTIONS ASSOCIATED WITH VEHICLE RECEIVING STATIONS

(71) Applicant: BlackBerry Limited, Waterloo (CA)

(72) Inventors: Conrad Delbert Seaman, Ottawa (CA); Stephen West, Manotick (CA); Kristian Neil Spriggs, Kanata (CA); Jason Wayne Jantzi, St. Clements (CA); Mahendra Fuleshwar Prasad, Waterloo (CA); Scott Leonard Dill, Paris (CA)

(73) Assignee: BlackBerry Limited, Waterloo, Ontario (CA)

( * ) Notice: Subject to any disclaimer, the term of this patent is extended or adjusted under 35 U.S.C. 154(b) by 238 days.

(21) Appl. No.: 15/684,082

(22) Filed: Aug. 23, 2017

(65) Prior Publication Data

US 2019/0066401 A1  Feb. 28, 2019

(51) Int. Cl.
| G07C 5/00 | (2006.01) |
| G06Q 10/08 | (2012.01) |
| G08G 1/0968 | (2006.01) |
| G08G 1/00 | (2006.01) |

(52) U.S. Cl.
CPC .............. *G07C 5/008* (2013.01); *G06Q 10/08* (2013.01); *G08G 1/096811* (2013.01); *G08G 1/205* (2013.01)

(58) Field of Classification Search
CPC ........ G07C 5/008; G06Q 10/08; G08G 1/205; G08G 1/096811
USPC .......................................................... 701/29.3
See application file for complete search history.

(56) References Cited

U.S. PATENT DOCUMENTS

| 2002/0065698 | A1 | 5/2002 | Schick et al. | |
| 2009/0248218 | A1* | 10/2009 | Dyrmose | F25D 29/003 700/300 |
| 2012/0010851 | A1* | 1/2012 | Mintz | G01G 19/021 702/173 |
| 2012/0109721 | A1 | 5/2012 | Cebon et al. | |
| 2014/0052412 | A1* | 2/2014 | Kadaba | G06K 19/0717 702/184 |
| 2016/0173505 | A1* | 6/2016 | Ichihara | H04L 63/123 713/170 |
| 2017/0124775 | A1* | 5/2017 | Breed | G07B 15/00 |

FOREIGN PATENT DOCUMENTS

JP          2010-218358         * 9/2010

OTHER PUBLICATIONS

Department of Transportation, Smart Roadside dated on or before Aug. 23, 2017 (2 pages).

(Continued)

*Primary Examiner* — Muhammad Shafi
(74) *Attorney, Agent, or Firm* — Trop, Pruner & Hu, P.C.

(57) ABSTRACT

In some examples, a system receives information transmitted by a vehicle, the information acquired by a sensor of the vehicle. In response to the received information, an action is performed by the system with respect to the vehicle or content transported by the vehicle, the action comprising one or more of directing the vehicle to a location, selecting the vehicle for inspection from a plurality of vehicles, performing inspection of the vehicle or the content at a border of a jurisdiction, and loading or unloading of the content.

19 Claims, 4 Drawing Sheets

(56) References Cited

OTHER PUBLICATIONS

Wikipedia, Electronic toll collection last modified Feb. 21, 2017 (17 pages).
Canadian Intellectual Property Office, International Search Report and Written Opinion for Appl. No. PCT/CA2018/050973 dated Nov. 2, 2018 (9 pages).

* cited by examiner

ACTIONS ASSOCIATED WITH VEHICLE RECEIVING STATIONS

BACKGROUND

Vehicles can be used to carry cargo or human occupants. Examples of vehicles include trucks, buses, cars, trailers, and so forth. Various infrastructure can be provided along roads to perform various different functions relating to vehicles and/or cargo/occupants of the vehicles. Examples of such infrastructure include toll stations, inspection stations, border crossing stations, and so forth. In many cases, inefficient processing of vehicles by any of the foregoing stations can lead to long queues or processing times.

BRIEF DESCRIPTION OF THE DRAWINGS

Some implementations of the present disclosure are described with respect to the following figures.

Figure 1:
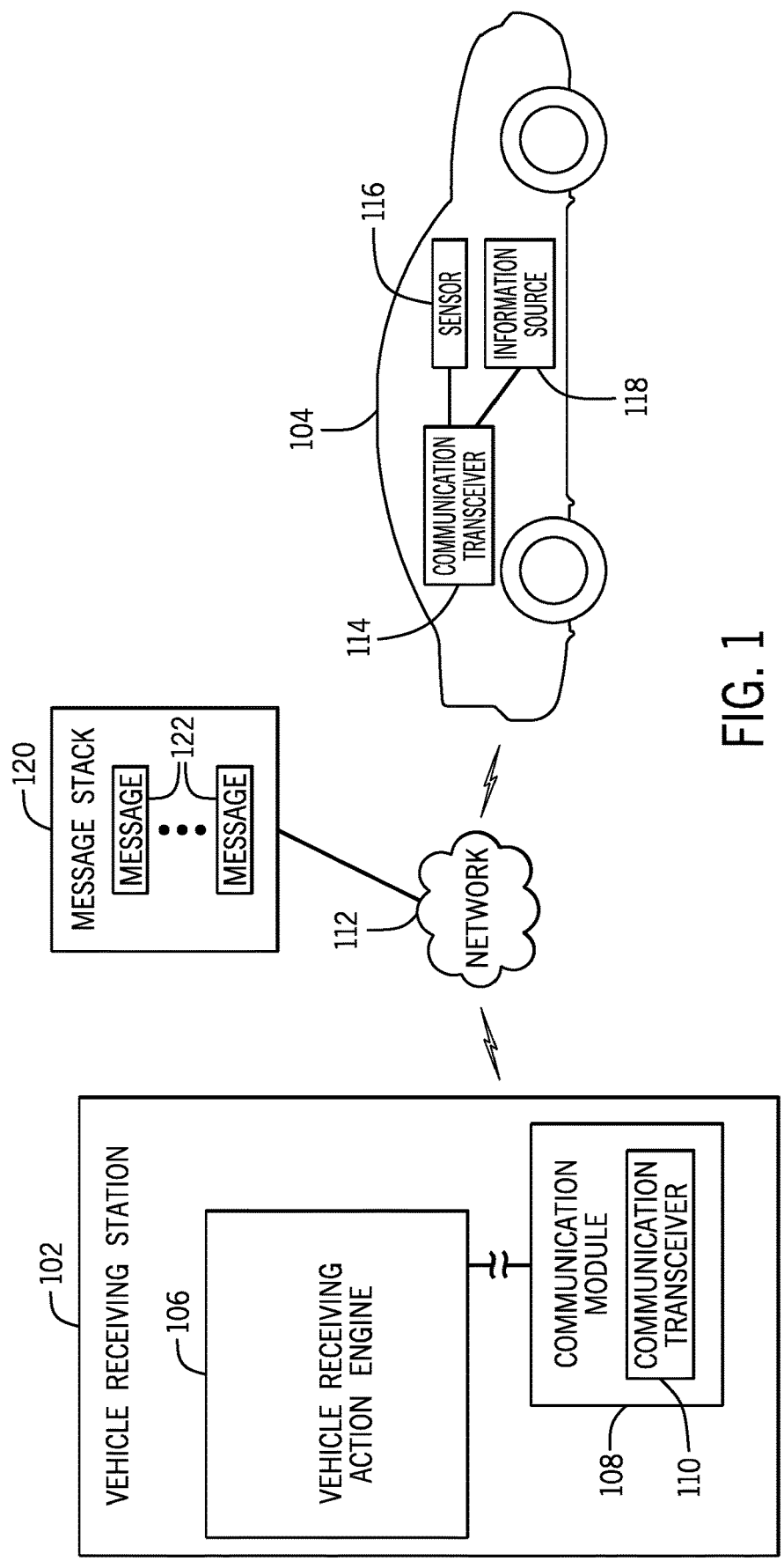
FIG. 1 is a block diagram of an example arrangement that includes an vehicle receiving station that can interact with a vehicle, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Generally, a "vehicle" can refer to any moveable platform that can be used to carry cargo or human occupants. A "cargo item" can refer to any physical item that is to be delivered from one location to another location. "Cargo" can refer to one or more cargo items. Examples of vehicles can include a truck, a car, a tractor, a trailer, a railed vehicle (e.g., a train), a water craft (e.g., a ship), an aircraft, a spacecraft, and so forth.

Infrastructure can be provided along roads to perform various tasks with respect to vehicles and/or the content of the vehicles, where "content" can refer to either cargo or a human occupant(s), or both. Examples of infrastructure that can be provided along a road can include any or some combination of the following vehicle receiving stations: a border crossing station, an inspection station, a content loading/unloading station, a toll station, or any other type of infrastructure. As used here, a "vehicle receiving station" can refer to a facility, or a part of a facility, that is used to perform specified task(s) with respect to a vehicle or the content of the vehicle. The vehicle receiving station can include equipment, a building, and/or a human operator(s).

A border crossing station is used at the border between different jurisdictions (e.g., different countries, different states or provinces, etc.) to control the ingress or egress of vehicles or content of vehicles between the jurisdictions. A border crossing station can include an immigration station that is used to check (as part of an immigration entry inspection) that human occupants have the proper permissions to enter or leave a jurisdiction. As another example, a border crossing station can include a customs station, which is used to control the import or export of cargo, and/or to apply duty or tariffs to the cargo that is being imported or exported.

An inspection station can refer to a station that is used to inspect vehicles or contents of vehicles. For example, an inspection station can be used to inspect a vehicle to ensure compliance of the vehicle with one or more criteria, such as a weight criterion (to ensure that the vehicle does not exceed a specified weight), a safety criterion (to ensure that an operating condition of the vehicle satisfies safety issues), and so forth. Operating conditions of a vehicle can include any or some combination of the following: a condition of a brake of the vehicle, a tire pressure of the vehicle, a level of a fluid in the vehicle, a condition of a light on the vehicle, and so forth. The content of a vehicle can also be inspected by an inspection station. For example, the cargo of a vehicle can be inspected to ensure that the vehicle is not carrying contraband or hazardous cargo. A human occupant can be inspected to ensure that the occupant is not intoxicated or under the influence of drugs. As further examples, the inspection station can inspect occupants in a search for fugitives or persons with criminal records.

A content loading or unloading station can refer to a station that is used to load or unload the content of a vehicle. For example, the content loading or unloading station can refer to a dock yard that is used for receiving trucks or trailers that are carrying cargo. At the dock yard, cargo can be loaded onto or unloaded from the trucks or trailers. As another example, the content loading or unloading station can refer to a bus station, an airport, a seaport, and so forth, at which humans can enter or exit vehicles.

A toll station can refer to a station that is used to collect tolls from vehicles passing specific points. A toll station can be provided on a toll road, for example. As another example, a toll station can be provided at the entry or exit of an infrastructure, such as a parking lot, and so forth.

Although specific examples of vehicle receiving stations are provided above, it is noted that other examples of vehicle receiving stations can be used.

FIG. 1 is a block diagram of an example arrangement that includes a vehicle receiving station 102 that is used for performing a specified action with respect to a vehicle 104. The vehicle receiving station 102 can include any of the following: a border crossing station, an inspection station, a content loading or unloading station, a toll station, and so forth. In the example of FIG. 1, the vehicle receiving station 102 includes a vehicle receiving action engine 106. The vehicle receiving action engine 106 is able to perform an action based on information received from the vehicle 104.

The vehicle receiving action engine 106 can be implemented using a hardware processing circuit which can include any or some combination of the following: a microprocessor, a core of a multi-core microprocessor, a microcontroller, a programmable integrated circuit device, a programmable gate array, or any other type of hardware processing circuit. In other examples, the vehicle receiving action engine 106 can be implemented as a combination of a hardware processing circuit and machine-readable instructions executable on the hardware processing circuit. Moreover, the vehicle receiving action engine 106 can be implemented with a computer system or a distributed arrangement of computer systems (such as a part of a server system, a cloud system, a web system, and so forth).

The vehicle receiving action engine 106 is coupled to a communication module 108 of the vehicle receiving station 102, where the communication module 108 includes a communication transceiver 110 to communicate with the vehicle 104 (or multiple vehicles) over a network 112. In some examples, the communication transceiver 110 can include a wireless transceiver that is able to communicate over a wireless network with the vehicle 104.

A wireless network can include a cellular network or a wireless local area network (WLAN). An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

A WLAN can operate according to the Institute of Electrical and Electronic Engineers (IEEE) 802.11 or Wi-Fi Alliance Specifications. In other examples, other types of wireless networks can be employed, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

The communication transceiver 110 is able to communicate with a communication transceiver 114 in the vehicle 104 over the network 112. In the vehicle 104, the communication transceiver 114 receives data from a sensor 116 and/or from another information source 118 in the vehicle 104. Although just one sensor 116 is shown in FIG. 1 in the vehicle 104, it is noted in other examples that the vehicle 104 can include multiple sensors, such as different types of sensors to measure different parameters. The sensor 116 can be used to measure various characteristics of the vehicle 104 or the content of the vehicle 104. For example, the sensor 116 can be used to measure an operating condition of the vehicle 104, such as a tire pressure, a wear level of a brake of the vehicle 104, a fluid level (e.g., oil level, coolant level, transmission fluid level, brake fluid level, etc.) of the vehicle 104, or any other operating condition or other characteristic of the vehicle 104.

In further examples, the sensor 116 can be used to determine characteristics of the content of the vehicle 104, including determining whether the vehicle 104 is carrying cargo, carrying occupants, and so forth. Moreover, the sensor 116 can be used to detect identities of occupants in the vehicle 104, such as by scanning identity cards (e.g., a passport, a driver's license, etc.) of each occupant.

The information source 118 can include an input device that can be used to provide information pertaining to cargo or occupant(s) of the vehicle 104. The input device can be an input device of a computer, such as a touchscreen, a keyboard, a mouse, a digital pen, and so forth. For example, an occupant of the vehicle 104 can enter their information (e.g., name, identity card number, etc.) into the information source 118, which can further include a storage medium to store the entered information. As another example, a loader of cargo can enter information regarding the cargo (e.g., name of cargo, type of cargo, amount of cargo, etc.) into the information source 118. The information regarding cargo or human occupants can be transmitted by the communication transceiver 114 of the vehicle 104, such as to the vehicle receiving station 102. In other examples, information of the vehicle 104 and/or content of the vehicle 104 can be received by the communication transceiver 114 from a remote source (outside of the vehicle 104). The received information can be stored in the information source 118 for later transmission to the vehicle receiving station 102.

Although not shown in FIG. 1, the vehicle receiving station 102 can include or can be coupled to equipment that is used to receive the vehicle 104 or the content of the vehicle 104. In some examples, the equipment can include a booth and associated equipment (e.g., scanning equipment to scan the vehicle 104, such as the vehicle's license plate or registration number, or to scan the content of the vehicle 104, such as to scan a barcode or other identifier of cargo or to scan an identity card of an occupant) at a border crossing station, inspection station, or toll station, for example. As other examples, the equipment can include a docking/undocking equipment to dock/undock the vehicle 104 and/or to load/unload the content of the vehicle 104.

As further shown in FIG. 1, in some examples, a message stack 120 can also be provided. Vehicles 104 can send messages (including various information as noted above) to the message stack 120 over the network 112. The messages can be stored as messages 122 in the message stack 120. The message stack 120 can refer to any data repository (e.g., a relational database, a non-relational data store, a file server, etc.) that can be used to store the messages 122. The message stack 120 can include a data store at one location or distributed across multiple locations.

Vehicle receiving stations 102 can listen to the messages 122 in the message stack 120. Different vehicle receiving stations 102 can be associated with different keys (such as public keys). A vehicle 104 can target a message to a given vehicle receiving station by encrypting the message using the key of the given vehicle receiving station. Other vehicle receiving stations would not be able to read the message encrypted using the key of the given vehicle receiving station.

Thus, each vehicle receiving station 102 can read just the message(s) targeted to the respective vehicle receiving station. In some examples, a subscribe technique can be used, where a vehicle receiving station can subscribe to messages targeted to the vehicle receiving station. In other examples, a vehicle receiving station can retrieve (pull) a message 122 from the message stack 120.

In further examples, vehicle receiving stations 102 can also send messages to the message stack 120, for retrieval by respective vehicles 104. In such examples, keys can also be associated with the vehicles 104, so that only messages encrypted by the respective key of the vehicle 104 can be read by the vehicle 104.

Figure 2:
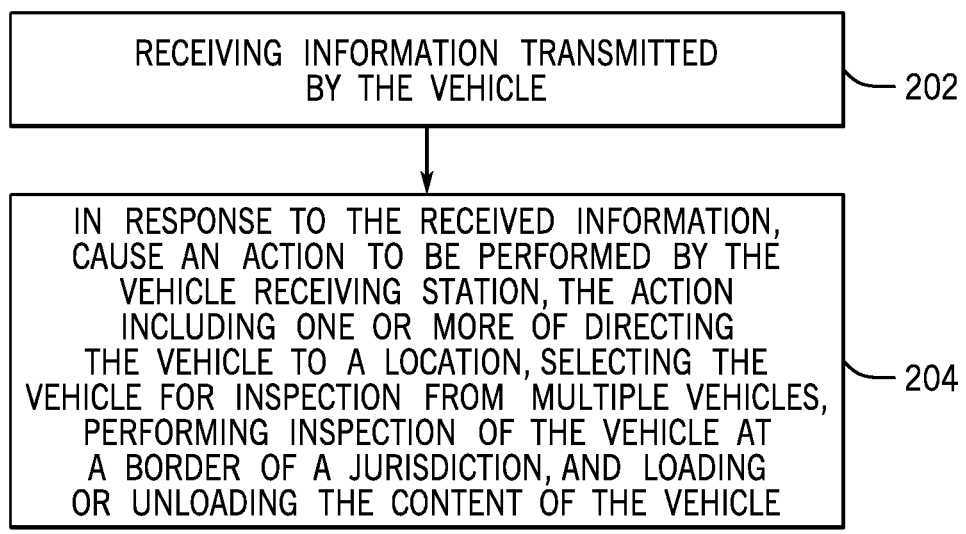
FIG. 2 is a flow diagram of an example process of a vehicle receiving engine, according to some implementations.

FIG. 2 is a flow diagram of an example process that can be performed by the vehicle receiving action engine 106, according to some implementations. The process includes receiving (at 202) information transmitted by the vehicle 104. In some examples, the information can be acquired by the sensor 116 (or by multiple sensors) of the vehicle 104. In other examples, the information is provided by the information source 118.

In response to the received information, the vehicle receiving action engine 106 causes (at 204) an action to be performed by the vehicle receiving station 102, where the action can include any or some combination of the following: directing the vehicle 104 to a location, selecting the vehicle 104 for inspection from multiple vehicles, performing inspection of the vehicle or the content of the vehicle 104 at a border of a jurisdiction, and loading or unloading the content of the vehicle 104.

In examples where the vehicle receiving station 102 is a border crossing station, the action that can be performed can include any or some combination of the following. The action can include directing the vehicle 104 to one of multiple queues of the border crossing station. For example, the border crossing station can include multiple sub-stations, and each sub-station can have a queue of multiple vehicles waiting to be processed. To enhance efficiency in processing vehicles, the vehicle receiving action engine 120 is able to direct vehicles to different queues to balance the load of the multiple sub-stations of the border crossing station. Directing the vehicle 104 to one of multiple queues can involve the vehicle receiving action engine 106 sending a message over the network 112 to the vehicle 104. This message can be displayed by a display device of the vehicle 104. For example, the message can indicate that the driver of the vehicle 104 is to drive the vehicle 104 to a particular sub-station (e.g., lane X, sub-station X, etc.).

In examples where the vehicle 104 is an autonomous (driver-less) vehicle, then the message can be sent to the controller (implemented as a computer) of the autonomous vehicle. The controller processes the message and directs the vehicle 104 to the sub-station or other location specified by the message.

The information that is received by the border crossing station from the vehicle 104 can include information relating to the content transported by the vehicle 104, and the action can include preparing documentation (e.g., previously stored information of the vehicle 104 or the content of the vehicle, selected form(s) to fill out by the personnel of the border crossing station, etc.) to process the vehicle or the content by the border crossing station. In further examples, the information provided by the vehicle 104 can include information describing cargo transported by the vehicle, and the action that can be triggered by the vehicle receiving action engine 106 can include a customs inspection of the cargo. In addition, the customs inspection can involve calculating a duty to charge for the cargo based on the information describing the cargo.

In further examples, the information transmitted by the vehicle 104 can include information of a human occupant that is being transported by the vehicle. In such examples, the action that can be triggered by the vehicle receiving action engine 106 can include an immigration entry instruction to determine whether entry by the occupant into the jurisdiction is allowed.

In examples where the vehicle receiving station 102 is an inspection station, the information that is transmitted by the vehicle 104 can include information describing the content that is being transported by the vehicle 104, and the action that is triggered by the vehicle receiving action engine 106 can include a determination of whether to approve the content or to subject the content to a physical inspection, based on the information describing the content transported by the vehicle 104.

In some cases, the information describing the content transported by the vehicle 104 may have been received by the inspection station while the inspection station was closed. For example, the inspection station can be a weigh station for weighing vehicles. In such examples, the action that is triggered by the vehicle receiving action engine 106 can include processing the information transmitted by the vehicle 104 about the weight of the vehicle 104 after re-opening of the inspection station. In other examples where the inspection station is a cargo inspection station, the information transmitted by the vehicle 104 can describe the content, and the action that is triggered by the vehicle receiving action engine 106 can include processing the information transmitted by the vehicle 104 about the cargo after re-opening of the inspection station.

In examples where the vehicle receiving station 102 is a loading or unloading station, the information that is transmitted by the vehicle 104 can include information describing the cargo transported by the vehicle 104, and the action that can be triggered by the vehicle receiving action engine 106 can include directing vehicles to respective bays or docks for performing loading or unloading of cargo. Additionally, the action can include prioritizing vehicles to load or unload cargo. For example, in some cases, the loading or unloading station (such as a dock yard) can be congested, with many vehicles waiting to be loaded and/or unloaded. Depending on the priorities associated with the cargo being carried by or to be carried by the respective vehicles (or depending on the priorities assigned to the vehicles themselves), the vehicle receiving action engine 106 can specify which vehicles are to be prioritized over other vehicles for loading and/or unloading cargo. For example, certain types of cargo may be perishable, such that such cargo should be prioritized over other cargo. In other examples, certain cargo may have to be delivered to a destination by a specified deadline, so that such cargo should be first loaded onto a vehicle.

In additional examples, operators of certain vehicles or owners/distributors of certain cargo may have paid a premium price to obtain a higher level of service (and thus priority) at the loading or unloading station relative to other operators or owners/distributors. Such vehicles associated with the premium service can be given higher priority over other vehicles not associated with a premium service.

In further examples, the information transmitted by the vehicle 104 can relate to a time or condition of the cargo that is transported by the vehicle 104, and the action triggered by the vehicle receiving action engine 106 can include recording the time or condition of the cargo. For example, when cargo is unloaded from the vehicle 104, the time at which the cargo is unloaded can be recorded, where such recorded time can provide an indication of whether or not delivery of the cargo was on time. This can be useful to assess penalties for late delivery of cargo, or to avoid a penalty by a shipper that has delivered a cargo on time.

In other examples, the information that can be recorded by the loading or unloading station can include information pertaining to the condition of the cargo. The condition of the cargo can include a temperature of the cargo, a pressure of the cargo, a humidity of the cargo, and so forth, as measured by the sensor 116 of the vehicle 104. The condition of the cargo can be useful for purposes of establishing that the cargo was delivered in a condition that met specified criteria. For example, the recorded information can establish that the cargo was delivered at a temperature that is less than a specified threshold temperature (e.g., perishable food was kept at a safe temperature).

In addition examples, the loading or unloading station can be used to load or unload human occupants, such as at a bus station, an airport, a seaport, and so forth. In such examples, the information that is transmitted by the vehicle 104 can include information describing the human occupants of the vehicle 104 or information of the vehicle 104 (e.g., a bus number, a flight number, a ship name, etc.). The action that can be can be triggered by the vehicle receiving action engine 106 can include directing vehicles to respective bays or docks (e.g., bus stops, airport gate, sea port, etc.) for performing loading or unloading of human occupants. As with examples for loading and/or unloading of cargo, to load and/or unload human occupants, vehicles and/or the occupants of the vehicles can be assigned respective priorities to determine which vehicles are serviced ahead of other vehicles by the loading or unloading station.

In further examples where the vehicle receiving station 102 is a toll station, the information that is transmitted by the vehicle 104 can include a load status of the vehicle 104 and distances traveled for each of a plurality of different load statuses. A load status can refer to whether or not the vehicle 104 is carrying content (cargo or occupants). If the vehicle 104 was not carrying content, then the vehicle 104 would not be subject to tolls. However, if the vehicle 104 was carrying content, then the vehicle 104 would be subjected to tolls, and such toll can be dependent upon the time duration or distance traveled by the vehicle 104 while the vehicle 104 was loaded with content. In such examples, the action that can be triggered by the vehicle receiving action engine 106 can include determining a toll to charge based on the information relating to the load status and the distance travelled or time travelled for each load status.

Messages exchanged between vehicles and vehicle receiving stations can include sensitive information, such as information about cargo or human occupants, or proprietary information of the vehicles themselves. To avoid unauthorized access of such information by hackers or other unauthorized entities, privacy of the information exchanged between vehicles and vehicle receiving stations can be provided by encrypting such information. For example, an encryption key can be used to encrypt information that is transmitted from a vehicle to a vehicle receiving station, or from a vehicle receiving station to a vehicle. Encryption keys can include public/private keys, where a public key can be used to encrypt information, and the encrypted information can be decrypted using the private key of the public-private key pair. Alternatively, information can be encrypted using a private key, and the encrypted information can be decrypted using the corresponding public key of the public-private key pair.

In further examples, a digital signature can be created for information communicated between vehicles and vehicle receiving stations. A digital signature can be produced by signing the information, such as by using a signing algorithm based on an encryption key. The digital signature can be used to authenticate the sender (a vehicle receiving station or a vehicle) of the information to verify that the sender is indeed the purported entity.

Figure 3:
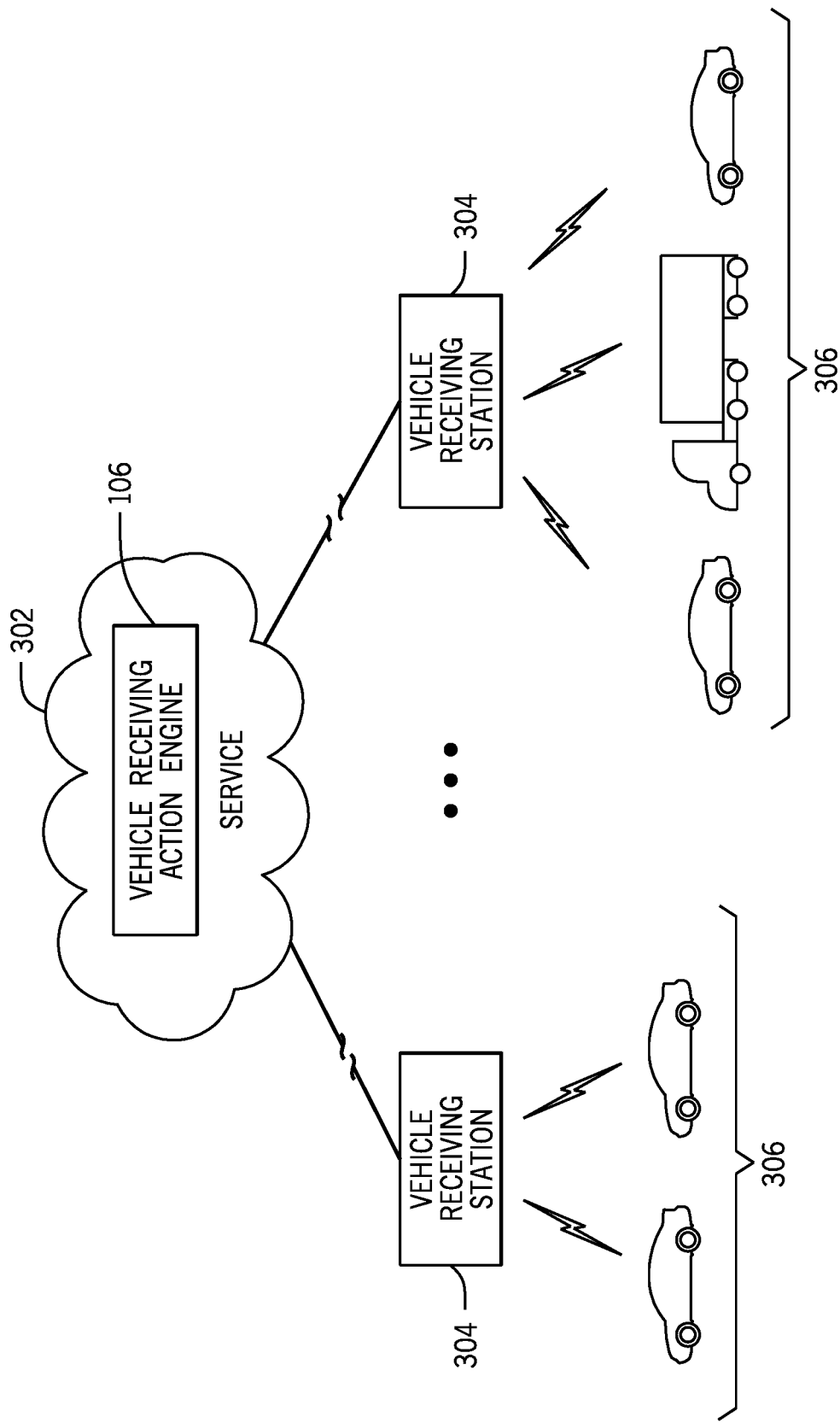
FIG. 3 is a block diagram of an example arrangement that includes a service including a vehicle receiving action engine, according to alternative implementations.

FIG. 3 is a block diagram of an example arrangement according to further implementations, where the vehicle receiving action engine 106 is part of an online service 302, such as a cloud service, a web service, or any other type of service that is accessible over a network, such as the internet or other type of network. The service 302 is implemented using a computer system, or a distributed arrangement of computer systems, and software executable on the computer system(s). The service 302 can be provided by computing infrastructure at one location, or can be provided by computing infrastructure spread out across multiple locations.

The service 302 is coupled to various vehicle receiving stations 304, such as over wired and/or wireless networks. Each vehicle receiving station 304 can be configured in similar fashion as the vehicle receiving station 102 of FIG. 1, except in FIG. 3 the vehicle receiving action engine 106 is deployed as part of the service 302 rather than as part of the vehicle receiving station 304. The vehicle receiving stations 304 are able to communicate with respective vehicles 306, to collect information from such vehicles and to apply actions with respect to such vehicles (including content of such vehicles), based on actions triggered by the vehicle receiving action engine 106.

Figure 4:
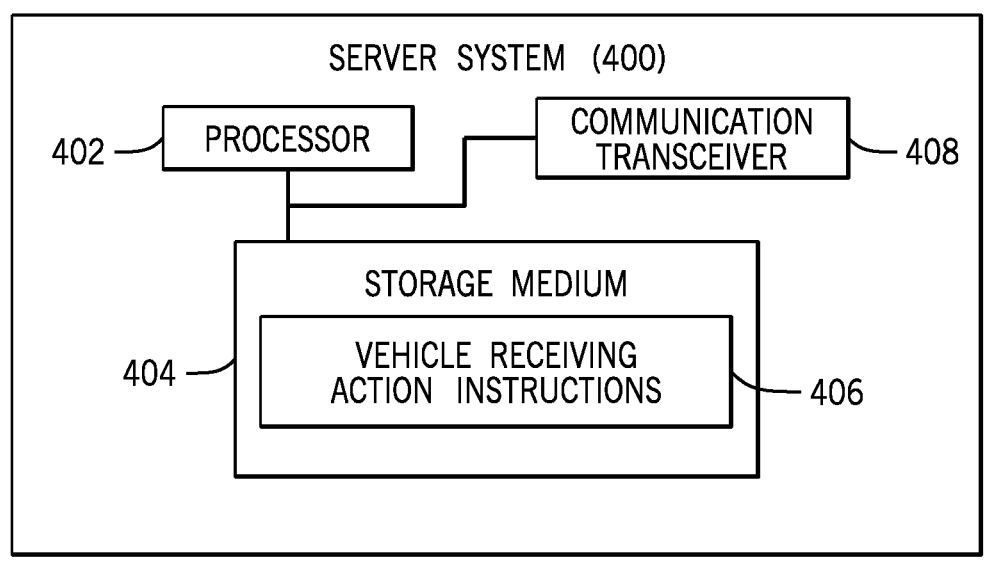
FIG. 4 is a block diagram of a server system according to some implementations.

FIG. 4 is a block diagram of a server system 400 according to some examples. The server system 400 includes a processor 402 (or multiple processors). A processor can include a microprocessor, a core of a multi-core microprocessor, a microcontroller, a programmable integrated circuit, a programmable gate array, or another hardware processing circuit.

The system 400 further includes a non-transitory machine-readable or computer-readable storage medium 404 storing machine-readable instructions, such as vehicle receiving action instructions 406 that are executable on the processor 402 to perform various tasks (of the vehicle receiving action engine 106) as discussed in the present disclosure. Instructions executable on a processor can refer to the instructions executing on one processor or on multiple processors.

The system 400 includes a communication transceiver 408, such as a wireless transceiver to communicate wireless signals (e.g., radio frequency or RF signals).

The storage medium 404 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a system associated with a vehicle receiving station, information transmitted by a vehicle, the information acquired by a sensor of the vehicle; and
in response to the received information, directing, by the system, the vehicle to a selected queue of a plurality of queues of the vehicle receiving station, wherein the directing of the vehicle comprises sending, by the system, a message over a network to a controller of the vehicle, the message instructing the vehicle to the selected queue.

2. The method of claim 1, wherein the vehicle receiving station comprises a border crossing station.

3. The method of claim 2, wherein the information comprises information relating to content transported by the vehicle, the method further comprising causing preparation, by the vehicle receiving station, of documentation to process the vehicle or the content by the border crossing station.

4. The method of claim 3, wherein the information comprises information describing cargo transported by the vehicle, the method further comprising calculating a duty to charge for the cargo based on the information describing the cargo.

5. The method of claim 1, wherein the vehicle receiving station comprises a content loading or unloading station.

6. The method of claim 5, wherein the information relates to a time or condition of cargo transported by the vehicle, the method further comprising recording the time or condition of the cargo.

7. The method of claim 6, wherein the information relating to the condition of the cargo is selected from among a temperature, a pressure, and a humidity.

8. The method of claim 5, wherein the information relates to content transported by the vehicle, the method further comprising directing the vehicle to a selected loading or unloading bay of a plurality of loading or unloading bays of the vehicle receiving station.

9. The method of claim 1, wherein the received information is protected by an encryption key.

10. The method of claim 1, wherein the received information is in a message received from a data store storing messages provided to the data store by a plurality of vehicles, wherein each respective message of the messages is encrypted with a respective key of a corresponding vehicle receiving station that is a target of the respective message.

11. The method of claim 1, wherein sending the message to the controller of the vehicle causes display of the message in a display of the vehicle.

12. The method of claim 1, wherein the vehicle is an autonomous vehicle, and wherein sending the message to the controller of the vehicle causes the autonomous vehicle to move to the selected queue.

13. The method of claim 1, further comprising:
selecting, by the system, the selected queue from among the plurality of queues for load balancing of the plurality of queues; and
sending, by the system, further messages to other vehicles to direct the other vehicles to other queues of the plurality of queues as part of the load balancing.

14. A system for an inspection station, comprising:
a processor, and
a non-transitory storage medium storing instructions executable on the processor to:
receive information transmitted by a vehicle, the information acquired by a sensor of the vehicle and describing content transported by the vehicle, the information describing the content transported by the vehicle being received while the inspection station was closed; and
in response to the received information, cause processing of the information after re-opening of the inspection station.

15. A non-transitory machine-readable storage medium comprising instructions that upon execution cause a system associated with a content loading or unloading station to:
receive information transmitted by a vehicle, the information acquired by a sensor of the vehicle and relating to content transported by the vehicle; and
in response to the received information, cause prioritizing of vehicles to load or unload the content by the content loading or unloading station.

16. The non-transitory machine-readable storage medium of claim 15, wherein the prioritizing of the vehicles comprises assigning a first vehicle carrying perishable cargo a first priority that is higher than a second priority assigned to a second vehicle carrying other cargo.

17. The non-transitory machine-readable storage medium of claim 15, wherein the prioritizing of the vehicles comprises assigning a first vehicle carrying cargo with a first deadline a first priority that is higher than a second priority assigned to a second vehicle carrying cargo with a second deadline that is later than the first deadline.

18. The non-transitory machine-readable storage medium of claim 15, wherein the prioritizing of the vehicles comprises assigning a first vehicle associated with a first level of service a first priority that is higher than a second priority assigned to a second vehicle associated with a second level of service lower than the first level of service.

19. A method comprising:
receiving, by a system associated with a toll station, information transmitted by a vehicle, the information acquired by a sensor of the vehicle and comprising a load status of the vehicle and distances traveled or time traveled for each of a plurality of different load statuses, the load status indicating whether or not the vehicle is carrying content; and
determining, by the system, a toll to charge based on the information, the toll to charge comprising a first toll amount responsive to the information indicating that the vehicle is carrying the content, and a second toll amount different from the first toll amount responsive to the information indicating that the vehicle is not carrying the content.

* * * * *